Oct. 23, 1951     R. HOWARD     2,572,154
THRESHOLD
Filed Aug. 14, 1950
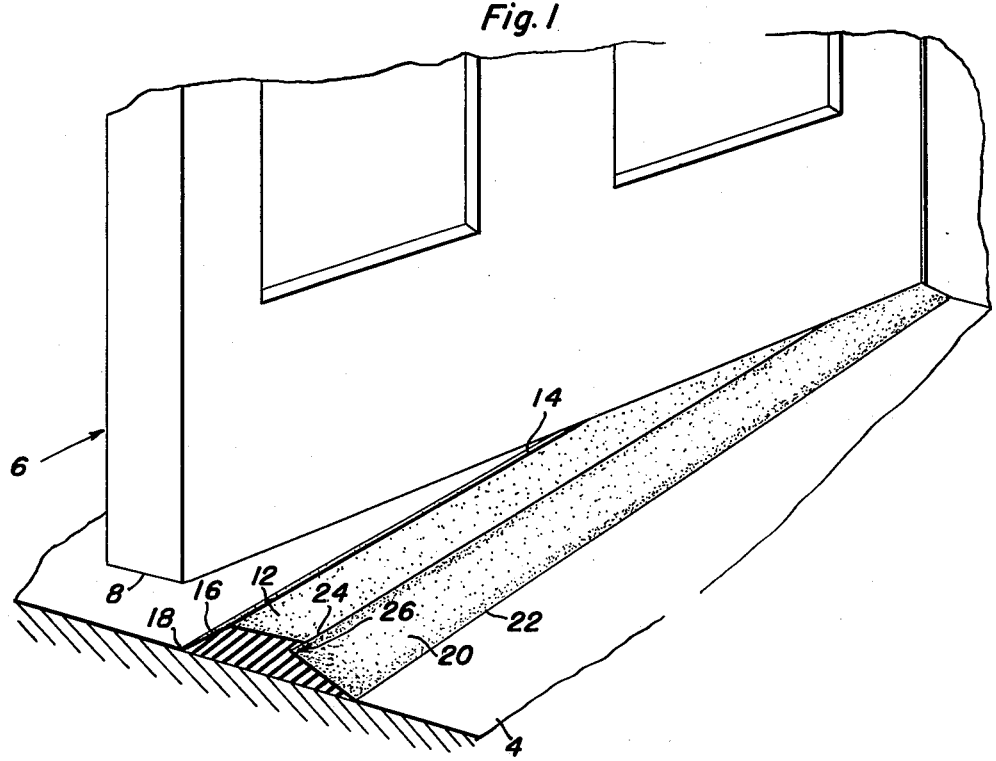
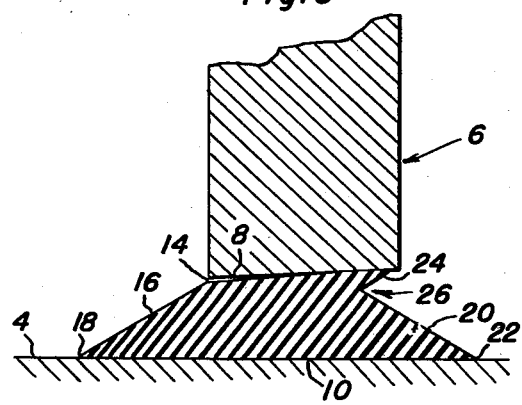
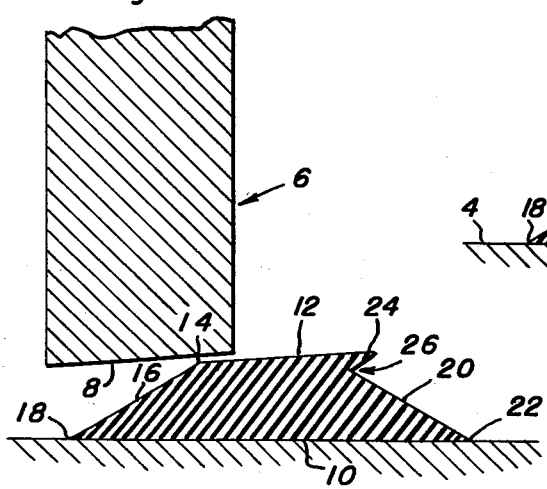
Roy Howard
INVENTOR.
BY *Clarence A. O'Brien*
*and Harvey B. Jackson*
Attorneys Patented Oct. 23, 1951

2,572,154

UNITED STATES PATENT OFFICE 2,572,154

THRESHOLD

Roy Howard, Vero Beach, Fla., assignor of thirty-three and one-third per cent to Merrill P. Barber, Vero Beach, Fla.

Application August 14, 1950, Serial No. 179,301

2 Claims. (Cl. 20—64)

The present invention relates to certain new and useful improvements in thresholds such as are used in doorways and the general object of the invention is to structurally and otherwise improve on wooden and equivalent thresholds which are now commonly used.

Another object of the invention is to provide a threshold in which manufacturers and users will find their essential needs fully met, contained and successfully available.

A further object of the invention is to provide a threshold which is made of compressibly resilient material, rubber, for example, which will be strong and durable, economical, easy to install and will effect a more effective seal between the floor and lower edge of the coacting door.

More specifically, novelty is predicated, on the one hand, on a rubber threshold whose top or crown portion is substantially flat to provide a satisfactory tread, the latter having a gradual slope inwardly and downwardly and the high longitudinal edge thereof serving to effect a weather-proof seal between itself and the bottom of the door, especially if the door bottom is cut on a satisfactory slant.

Then, too, novelty is predicated on a threshold of rubber having a flat bottom which may be readily glued or otherwise secured to the floor or sill and which has, in addition, a slanting interior side wall which merges into the floor surface through the medium of a feather edge and which provides an ideal "ramp" to facilitate effective sweeping of dirt and dust from a room over the threshold to the exterior and obviate the need for a dustpan and brush.

What is more important, novelty is predicated on a rubber threshold whose outer side surface also slants downwardly and outwardly toward the floor, the corresponding longitudinal edge portion of the top of the threshold being formed into a projecting V-shaped lip, said lip serving as a yieldable weather strip when contacting the door, which assists in preventing rain from beating in between the door and threshold and which functions as a successful insect guard in that it frustrates ants and insects from climbing up and passing over the tread or top portion of the threshold.

Other objects and advantages will become more readily apparent from the following description and the accompanying illustrative drawings.

In the accompanying sheet of drawings, wherein like numerals are employed to designate like parts throughout the views:

Figure 1 is a fragmentary perspective view showing a portion of a floor, portion of a door and frame, and the improved rubber threshold.

Figure 2 is a view in fragmentary section showing the threshold and door and illustrating the coacting angular surfaces which render the threshold novel, the door being open.

Figure 3 is a view based on Figure 2 showing how the door and threshold coact when the door is closed.

Referring now to the drawings by numerals and lead lines and with respect, primarily, to Figure 1, the floor is denoted by the numeral 4 and the door by the numeral 6. The door is any conventional door. However, in order to adapt a door for effective coaction with the improved threshold, the lower edge portion is preferably cut on a slight miter or slant, as denoted at 8.

The improved threshold is of a suitable grade of rubber which is properly resilient and compressible and has the properties necessary for rough usage and longevity. The threshold is polygonal in cross-section. It is characterized by a perfectly level and flat bottom 10 which may be glued or otherwise adhesively secured to the floor to lie beneath the door when the door is closed. The top 12 is also flat and is somewhat narrower than the bottom. However, the top has a slight slope which declines inwardly and downwardly. The left-hand edge 14 merges into the interior or inner side surface 16. This slants inwardly and downwardly and is also flat. The slant is on an approximate thirty degree angle. It joins the bottom at an acute angle, as at 18, which provides a feather edge. The feather edge lying in close and intimate contact with the surface of the floor enables said side surface 16 to serve as a "ramp" which is ideal to enable the housewife to sweep, with an ordinary broom, dust and dirt over the surface, over the top 12 and to the outside of the building.

The outer side surface 20 is also flat and has a thirty degree outwardly and downwardly disposed slant which joins the bottom by way of an acute angular feather edge 22. The outer longitudinal edge portion of the top 12 is fashioned with an outwardly projecting yieldable lip 24 which lip is substantially V-shaped in cross-section and provides a V-shaped lengthwise crotch 26. This lip is important in that it coacts with the bevelled bottom of the door in effecting a weather-proof seal. Therefore, it may be referred to, on the one hand, as an elastic weather-strip. Also, the presence of the V-shaped pocket or crotch 26 tends to prevent rain, during a heavy storm, from being driven up over the threshold and between the same and the door. Not only this, but the lip 24 overhangs the slanting outer side surface 20, enabling the latter to effectively shed water and melting snow. Of equal importance is the fact that the overhanging lip 24 coacts with the surface 20 in providing an insect guard. Ants and similar bugs attempting to mount the inclined surface 20 will be confronted with the lip 24 which constitutes an overhanging barrier and it therefore becomes an effective insect guard.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A threshold for use in a doorway comprising an elongated solid one-piece block of rubber, the latter being polygonal in cross-section and having a smooth flat bottom suitable for glued retention on a floor or the like, having a flat top narrower than said bottom and sloping gradually inwardly and downwardly, said top constituting a tread, having an inwardly and downwardly inclined interior side surface on an approximate thirty degree angle joining said bottom in acute angular relationship and combining therewith to provide a feather edge and to facilitate sweeping floor dirt and dust from a room over the threshold unobstructedly, having an outwardly and downwardly inclined outer side surface pitched also on a thirty degree angle, and, finally, provided with a V-shaped lip projecting from said top and overhanging said outer side surface.

2. A threshold for use on a door sill comprising an elongated one-piece solid body of compressibly resilient material embodying a flat surfaced bottom, a flat surfaced top having a slight slope relative to said bottom, and inner and outer side surfaces, the outer side surface inclining sharply from the top to the bottom and joining the bottom in acute angular relationship to define a feather edge, the inner side surface also inclining and joining said bottom in acute angular relationship to provide an interior feather edge, and one longitudinal edge of said top projecting beyond said outer side surface, being V-shaped in cross-section and defining an overhanging yielding lip, an insect guard and a weather-strip.

ROY HOWARD.

REFERENCES CITED

The following references are of record in the file of this patent:

UNITED STATES PATENTS

| Number | Name | Date |
|---|---|---|
| 463,148 | Gingrich | Nov. 17, 1891 |
| 971,374 | Haskell | Sept. 27, 1910 |
| 1,700,152 | Beck | Jan. 29, 1929 |